US008909625B1

(12) United States Patent
Stewenius (10) Patent No.: US 8,909,625 B1
(45) Date of Patent: Dec. 9, 2014

(54) IMAGE SEARCH (75) Inventor: Henrik C. Stewenius, Zürich (CH)

(73) Assignee: Google Inc., Mountain View, CA (US)

( * ) Notice: Subject to any disclaimer, the term of this patent is extended or adjusted under 35 U.S.C. 154(b) by 197 days.

(21) Appl. No.: 13/473,945

(22) Filed: May 17, 2012

Related U.S. Application Data (60) Provisional application No. 61/492,531, filed on Jun. 2, 2011.

(51) Int. Cl.
*G06F 17/30* (2006.01)
(52) U.S. Cl.
USPC .......................................... 707/723; 707/737
(58) Field of Classification Search
CPC .......... G06F 17/30247; G06F 17/3025; G06F 17/30256; G06F 17/30259; G06F 17/30265
USPC ................................. 707/723, 737, 749, 757
See application file for complete search history.

(56) References Cited

U.S. PATENT DOCUMENTS

| 7,603,370 B2 | 10/2009 | Manasse |
| 2003/0195883 A1* | 10/2003 | Mojsilovic et al. ................ 707/6 |
| 2006/0193538 A1* | 8/2006 | Vronay et al. ................ 382/305 |

\* cited by examiner

*Primary Examiner* — Thu-Nguyet Le
(74) *Attorney, Agent, or Firm* — Fish & Richardson P.C.

(57) ABSTRACT

Methods, systems, and apparatus, including computer programs encoded on a computer storage medium, for selecting image search results. In one aspect, a method includes receiving image search data specifying images that have been identified as responsive to a query. A set of image group identifiers are received for two or more of the images. Different image group identifiers specify different image groups to which an image belongs. A determination is made that the sets of image group identifiers for two images each include a matching image group identifier. In response to the determination the two images are determined to be near-duplicate images, and a presentation position for a search result that references one of the near-duplicate images is adjusted. Data that cause presentation of search results that reference the near-duplicate images according to the adjusted presentation position.

30 Claims, 4 Drawing Sheets

IMAGE SEARCH

CROSS-REFERENCE TO RELATED APPLICATIONS

This application claims the benefit under 35 U.S.C. §119 (e) of U.S. Patent Application No. 61/492,531, entitled "Image Search," filed Jun. 2, 2011, which is incorporated herein by reference in its entirety.

BACKGROUND

This specification relates to data processing and information retrieval.

The Internet enables access to a wide variety of resources. Images, video files, audio files, web pages for particular subjects, book articles, and news articles are examples of resources that are accessible over the Internet. A search system can identify resources in response to a user query that includes one or more search terms or phrases. Search systems generally identify and score resources based, at least in part, on their relevance to the query, and the search results can be ordered for presentation according to these scores.

The relevance of a resource to a user query can be determined, in part, based on the textual content of the resource or textual content associated with the resource. For example, text included in the content of a resource can be compared to the query to determine a relevance score indicative of the relevance of the resource to the query. In turn, the resources can be ordered, at least in part, based on the relevance scores.

Images are example resources that can be identified as relevant to a query based on textual content associated with the image. Text appearing with an image on a web page can be used to classify the image and/or compute a relevance score that is indicative of the relevance of the image to a search query. For example, an image that appears on a web page with the text "football" may be identified as relevant to the queries "football," and/or "sports." In turn, the image can be referenced in search results for these queries. While images can be identified as relevant to a query based on text that is associated with the images, images that are presented to a user in response to a particular query may be near-duplicate images. For example, a same image or a slight variation of an image may appear on many different web pages, such that each instance of the image (or slight variation) may be identified as a separate image that is responsive to the search query.

SUMMARY

In general, an aspect of the subject matter described in this specification can be embodied in methods that include the actions of receiving image search data specifying images that have been identified as responsive to a query; for two or more of the images, receiving a set of image group identifiers, different image group identifiers specifying a different image groups to which the image belongs; determining that the sets of image group identifiers for two images each include a matching image group identifier, and in response to the determination: determining that the two images are near-duplicate images; and adjusting a presentation position for a search result that references one of the near-duplicate images; and providing data that cause presentation of search results that reference the near-duplicate images according to the adjusted presentation position. Other embodiments of this aspect include corresponding systems, apparatus, and computer programs, configured to perform the actions of the methods, encoded on computer storage devices.

These and other embodiments can each optionally include one or more of the following features. Methods can further include the actions of receiving image data specifying a plurality of images that are included in a collection of images, the image data specifying feature values for each of the images, the feature values for each image including values that represent visual characteristics of the image; selecting a first reference image from the collection of images; for each of a plurality of other images in the collection of images, receiving a first image similarity score for the other image, the first image similarity score being indicative of visual similarity between the other image and the first reference image; identifying the other images that have a first image similarity score that exceeds a similarity threshold; and including, in a set of image group identifiers for the reference image, an image group identifier for at least one of the other images that have the first image similarity score that exceeds the similarity threshold. Methods can further include the actions of ordering the plurality of images that are included in the collection of images according to a fixed attribute for the plurality of images.

Receiving image data can include receiving image data that include timestamps indicating times at which the images were added to the collection of images. Ordering the plurality of images according to a fixed attribute can include assigning the images to ordinal positions according to the times indicated by the timestamps for the images, the image having a timestamp indicating an earliest time among the times being at a highest ordinal position.

Methods can further include the actions of selecting a second reference image from the collection of images, the second reference image being in a next ordinal position relative to the ordinal position of the first reference image; for each of a plurality of the other images that are at higher ordinal positions relative to the next ordinal position of the second reference image, obtaining a second image similarity score for each of the other images, the second image similarity score being indicative of a visual similarity between the other image and the second reference image; and including, in a set of image group identifiers for the second reference image, image identifiers for each of the other images for which the second similarity score exceeds the similarity threshold. Methods can further include the action of including, in the set of image group identifiers for the second reference image, an additional image group identifier that is selected from a set of group identifiers for one of the other images for which the second similarity score exceeds the similarity threshold.

Adjusting the presentation position for a search result that references one of the near-duplicate images can include adjusting the presentation position of the search result for the near-duplicate image having a timestamp that specifies a most recent time. Adjusting a presentation position for a search result that references one of the near-duplicate images can include causing the search result that references one of the near-duplicate images to be presented at a less prominent presentation position relative to the presentation position at which the search result for the one near-duplicate image would have been presented prior to the adjustment. Adjusting a presentation position for a search result that references one of the near-duplicate images can include preventing the search result for one of the near-duplicate images from being provided to or presented at a user device. Determining that the sets of image group identifiers for two images each include a matching image group identifier can include determining that the sets of image group identifiers for the two images include a same matching image group identifier.

Another aspect of the subject matter described in this specification can be embodied in methods that include the actions of receiving image data specifying a plurality of images that are included in a collection of images, the image data for each of the images specifying feature values for the image, the feature values for each image including values that represent visual characteristics of the image; selecting a first reference image from the collection of images; for each of a plurality of other images in the collection of images, receiving a first image similarity score for the other image, the first image similarity score being indicative of visual similarity between the other image and the first reference image; identifying the other images that have a first image similarity score that exceeds a similarity threshold; and including, in a set of image group identifiers for the reference image, an image group identifier for at least one of the other images that have the first image similarity score that exceeds the similarity threshold. Other embodiments of this aspect include corresponding systems, apparatus, and computer programs, configured to perform the actions of the methods, encoded on computer storage devices.

Methods can further include the actions of ordering the plurality of images that are included in the collection of images according to a fixed attribute for the plurality of images. Receiving image data can include receiving image data that include timestamps indicating times at which the images were added to the collection of images. Ordering the plurality of images according to a fixed attribute can include assigning the images to ordinal positions according to the times indicated by the timestamps for the images, the image having a timestamp indicating an earliest time among the times being at a highest ordinal position.

Methods can further include the actions of selecting a second reference image from the collection of images, the second reference image being in a next ordinal position relative to the ordinal position of the first reference image; for each of a plurality of the other images that are at higher ordinal positions relative to the next ordinal position of the second reference image, obtaining a second image similarity score for each of the other images, the second image similarity score being indicative of a visual similarity between the other image and the second reference image; and including, in a set of image group identifiers for the second reference image, image identifiers for each of the other images for which the second similarity score exceeds the similarity threshold. Methods can further include the actions of including, in the set of image group identifiers for the second reference image, an additional image group identifier that is selected from a set of group identifiers for one of the other images for which the second similarity score exceeds the similarity threshold.

Methods can further include the actions of receiving image search data specifying images that have been identified as responsive to a query; for two or more of the images, receiving a set of image group identifiers, different image group identifiers specifying different image groups to which the image belongs; determining that the sets of image group identifiers for two images each include a matching image group identifier, and in response to the determination: determining that the two images are near-duplicate images; and providing data indicating that the two images are near-duplicate images.

Methods can further include the actions of adjusting a presentation position for a search result that references one of the near-duplicate images; and providing data that cause presentation of search results that reference the near-duplicate images according to the adjusted presentation position.

Adjusting the presentation position for a search result that references one of the near-duplicate images can include adjusting the presentation position of the search result for the near-duplicate image having a timestamp that specifies a most recent time. Adjusting a presentation position for a search result that references one of the near-duplicate images can include causing the search result that references one of the near-duplicate images to be presented at a less prominent presentation position relative to the presentation position at which the search result for the one near-duplicate image would have been presented prior to the adjustment. Adjusting a presentation position for a search result that references one of the near-duplicate images can include preventing the search result for one of the near-duplicate images from being provided to or presented at a user device. Determining that the sets of image group identifiers for two images each include a matching image group identifier can include determining that the sets of image group identifiers for the two images include a same matching image group identifier.

Particular embodiments of the subject matter described in this specification can be implemented so as to realize one or more of the following advantages. Image search results can be filtered so that more diverse images can be provided in response to a search query. The computing storage resources required to identify near-duplicate images in search results is reduced by grouping near-duplicate images prior to receipt of the search query, and using data indicative of the groupings to determine whether images that have been identified as responsive to the search query are near-duplicates.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Near-duplicate images are identified and the presentation position for at least one image search result that reference one of the near-duplicate images is adjusted. A near-duplicate image for a reference image is an image that has an image similarity score (relative to the reference image) that meets or exceeds a similarity threshold. As described in more detail below, the image similarity score for an image relative to a reference image is a value indicative of visual similarity between the image and the reference image.

When a near-duplicate image for a reference image is identified, the reference image can be associated with (e.g., indexed according to, stored with a reference to, or referenced by) a group image identifier for the near-duplicate image (e.g., an identifier indicative of an image group to which the near-duplicate image belongs). A set of image group identifiers can be maintained for each image in a collection of images. When two images are determined to be responsive to a query are each associated with a matching image group identifier, these two images are determined to be near-duplicate images. In turn, the presentation position of a search result that references one of the near-duplicate images can be adjusted, for example, such that the search result is presented at a less prominent presentation position or prevented from being provided or presented at the user device. In some implementations, data indicating that near-duplicate images were identified as responsive to the search query are provided to another data processing apparatus.

Figure 1:
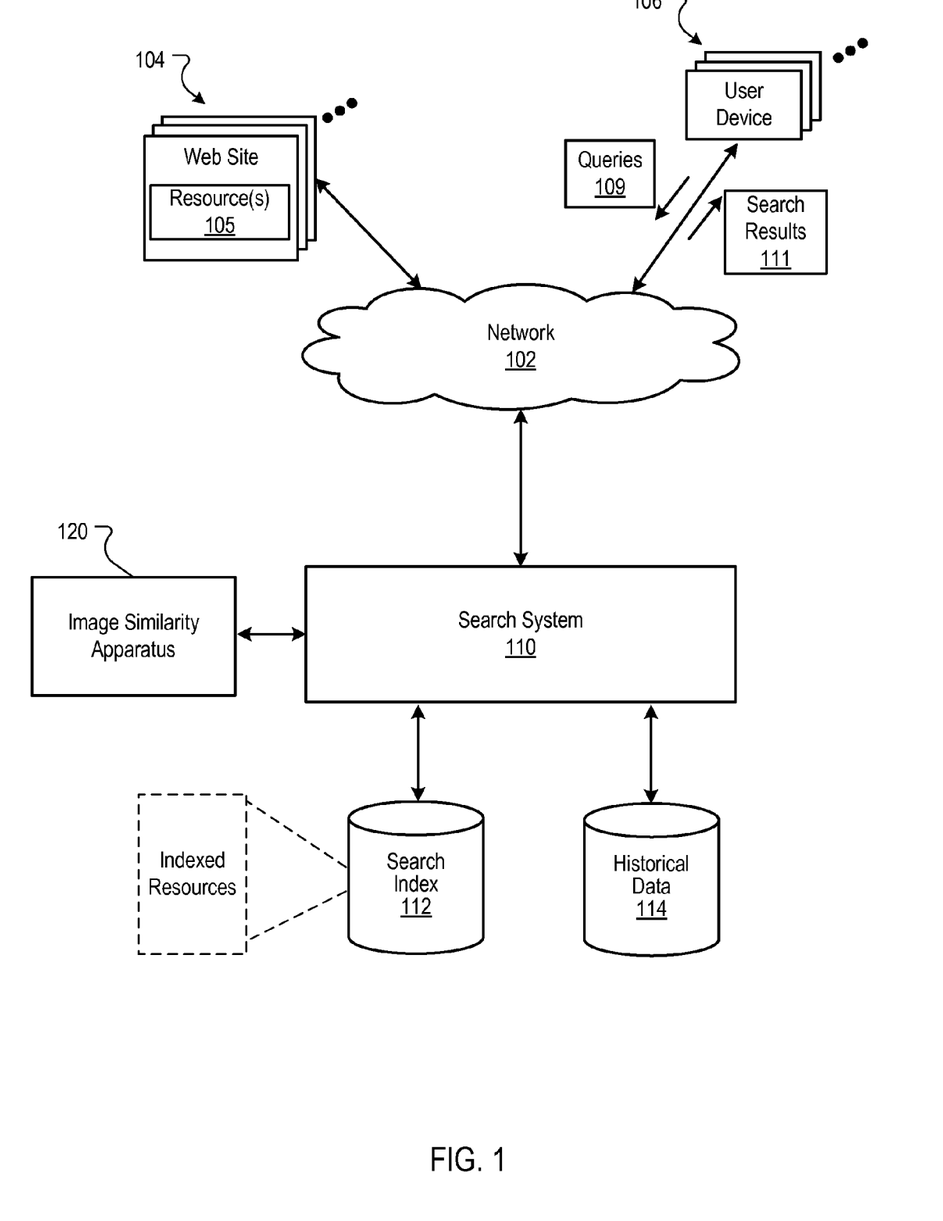
FIG. 1 is a block diagram of an example environment in which a search system provides search services.

FIG. 1 is a block diagram of an example environment 100 in which a search system 110 provides search services. The example environment 100 includes a network 102, e.g., a local area network (LAN), wide area network (WAN), the Internet, or a combination of them, connects web sites 104, user devices 106, and the search system 110. The environment 100 may include many thousands of web sites 104 and user devices 106.

A web site 104 is one or more resources 105 associated with a domain name and hosted by one or more servers. An example web site is a collection of web pages formatted in hypertext markup language (HTML) that can contain text, images, multimedia content, and programming elements, e.g., scripts. Each web site 104 is maintained by a publisher, e.g., an entity that manages and/or owns the web site.

A resource 105 is any data that can be provided by a web site 104 over the network 102 and that is associated with a resource address. Resources 105 include web pages, word processing documents, and portable document format (PDF) documents, images, video, and feed sources, to name just a few. The resources 105 can include content, e.g., words, phrases, images and sounds and may include embedded information (e.g., meta information and hyperlinks) and/or embedded instructions (e.g., code scripts).

A user device 106 is an electronic device that is under control of a user and is capable of requesting and receiving resources 105 over the network 102. Example user devices 106 include personal computers, mobile communication devices, and other devices that can send and receive data over the network 102. A user device 106 typically includes a user application, e.g., a web browser, to facilitate the sending and receiving of data over the network 102.

To facilitate searching of resources 105, the search system 110 identifies the resources 105 by crawling and indexing the resources 105 provided on web sites 104. Data about the resources 105 can be indexed based on the resource to which the data corresponds. The indexed and, optionally, cached copies of the resources 105 are stored in a search index 112.

The user devices 106 submit search queries 109 to the search system 110. In response, the search system 110 accesses the search index 112 to identify resources 105 that are relevant to (e.g., have at least a minimum specified relevance score for) the search query 109. The search system 110 identifies the resources 105, generates search results 111 that identify the resources 105, and returns the search results 111 to the user devices 106. A search result 111 is data generated by the search system 110 that identifies a resource 105 that is responsive to a particular search query, and can include a link to the resource 105. An example search result 111 can include a web page title, a snippet of text or a portion of an image extracted from the web page, and the URL of the web page.

For a search of textual content, the search results are ranked based, at least in part, on scores related to the resources 105 identified by the search results 111, such as information retrieval ("IR") scores, and optionally a quality score of each resource relative to other resources. In some implementations, the IR scores are computed from dot products of feature vectors corresponding to a search query 109 and a resource 105, and the ranking of the search results is based on initial relevance scores that are a combination of the IR scores and page quality scores. The search results 111 are ordered according to these initial relevance scores and provided to the user device 106 according to the order.

For a search directed to images that uses a text query as input, the search system 110 can combine the initial relevance score of a resource with a relevance feedback score of an image embedded in the resource. An example relevance feedback score is a score derived from a selection rate (e.g., click-through-rate or another interaction rate) of an image when that image is referenced in a search result for a query. These combined scores are then used to present search results directed to the images embedded in the resources 105.

The initial relevance scores for an image can be based, in part, on labels that are associated with the image. Labels can be textual content or data flags that indicate a topic or category to which the image belongs. Labels can be explicitly associated with (e.g., indexed according to and/or stored with a reference to) an image, for example, by the publisher that is providing the image. For example, a publisher can associate the text "football" with an image that includes content that is related to football (e.g., an image of a football or a football player). Labels can also be explicitly associated with an image by users to whom the image is presented. For example, users can engage in activities, such as online games, in which the users provide text that describes the content of an image that is presented to the user. In turn, when a threshold portion of users have specified particular text as being descriptive of the image, the image can be labeled with the particular text.

Labels can also be associated with an image based on relevance feedback for the image. In some implementations, a label that matches a query can be associated with (e.g., assigned to, indexed according to, and/or stored with a reference to) an image when the image is selected for presentation by users with at least a threshold selection rate. In turn, the label can then be used to select the image for reference in search results responsive to future instances of the query.

For example, assume that the threshold selection rate is 30%, and that an image of a football has been referenced by search results that were provided in response to the search query "pig skin." In this example, if the selection rate of the image of the football exceeds 30%, the label "pig skin" can be associated with the image of the football.

The initial relevance score for an image relative to a particular query can also be based on how well an image label matches the particular query. For example, an image having a label that is textually the same as the particular query can have a higher relevance score than an image having a label that is a root of the query or otherwise matches the query based on query expansion techniques (e.g., synonym identification or clustering techniques). Similarly, images having labels that match the query are identified as more relevant to the query than images that do not have labels matching the query. In turn, the reference positions at which images having labels that match the query can be higher than the search result positions at which images that do not match the query are referenced.

The user devices 106 receive the search results 111, e.g., in the form of one or more web pages, and render the search results for presentation to users. In response to the user selecting (or hovering over) a link in a search result at a user device 106, the user device 106 requests the resource 105 identified by the link. The web site 104 hosting the resource 105 receives the request for the resource from the user device 106 and provides the resource 105 to the requesting user device 106.

The informational needs of a user can more likely be satisfied when the search results that are presented to the user in a single search results reference various content. For example, assume that the same image has been included in many different online news articles and reproduced in many different blogs, and that each instance of this same image is identified as being relevant (e.g., based on relevance scores) to a particular query. Each instance of the image is included in a different resource, such that each instance of the image may be referenced by a different search result. Therefore, it is possible that this image will be the only image (or a large portion of the images) that is presented on a search results page that is presented in response to the particular query. Thus, if the user is searching for a different image that may have a lower relevance score, but is still relevant to the particular query, the user may need to request additional search results pages and/or submit additional search queries to satisfy their informational need (e.g., obtaining a copy of the different image). However, if more visually diverse images were included in the initial search results page, the user's informational need may be satisfied by the initial search results page.

The environment 100 includes an image similarity apparatus 120 that identifies near-duplicate images and adjusts presentation positions of search results that reference near-duplicate images. The image similarity apparatus 120 can be implemented as part of the search system 110 or as an apparatus that operates independent of the search system 110. The image similarity apparatus 120 can be in direct communication with the search system 110 or communicate with the search system 110 over the network 102.

The image similarity apparatus 120 can determine that two or more different search results reference images that are near-duplicates of each other, and prevent one of the search results from being provided or presented at a user device. The search result can be prevented from presentation on an initially presented search results page, for example, by reducing the initial relevance score of the search result. Alternatively, one of the search results that references one of the near-duplicate images can be removed from a set of search results that have been identified as responsive to the search query.

The image similarity apparatus 120 can determine that two images are near-duplicate images based on image groups to which each of the images belongs. In some implementations, the image similarity apparatus 120 receives, for each of the images that are referenced by a search result, a set of image group identifiers that specify image groups to which the image belongs. As described in more detail below, each image that belongs to a particular image group can be considered to be a near-duplicate of the other images that belong to the particular image group. Using these sets of image group identifiers, the image similarity apparatus can determine if any of the images are grouped to the same image group. If any two (or more) images belong to the same image group, the image similarity apparatus 120 identifies the images as near-duplicate images, and adjusts the presentation position for at least one of the search results that reference the near-duplicate images.

Using image group identifiers to identify search results that reference near-duplicate images reduces the computing resources that are required to identify the search results that reference near-duplicate images. Therefore, the identification can be performed in response to receipt of a search query without significantly increasing the time required to select the set of search results that are provided in response to the search query. For example, as described in more detail below, the similarity of an image to a reference image can be determined prior to the time at which a query is received ("query time"), and the image can be assigned to the same image group as the reference image (and associated with a corresponding image group identifier) when the image is determined to be a near-duplicate of the reference image (e.g., based on a visual similarity score). Each other image that is identified as a near-duplicate of the reference image (e.g., based on visual similarity scores) will also be assigned to the same image group as the reference image (and associated with the corresponding image group identifier). Therefore, at query time, the image group identifiers for the image groups can be used to identify the search results that reference near-duplicate images without requiring additional image similarity processing.

The following describes, in more detail, the identification of near-duplicate images and filtering search results that reference near-duplicate images. For example, a data flow for identifying near-duplicate images and filtering search results is described with reference to FIG. 2. An example process for identifying search results that reference near-duplicate images based on image group identifiers and adjusting presentation positions of the search results that reference the near-duplicate images is described with reference to FIG. 3. An example process for selecting image group identifiers for images is described in more detail with reference to FIG. 4.

Figure 2:
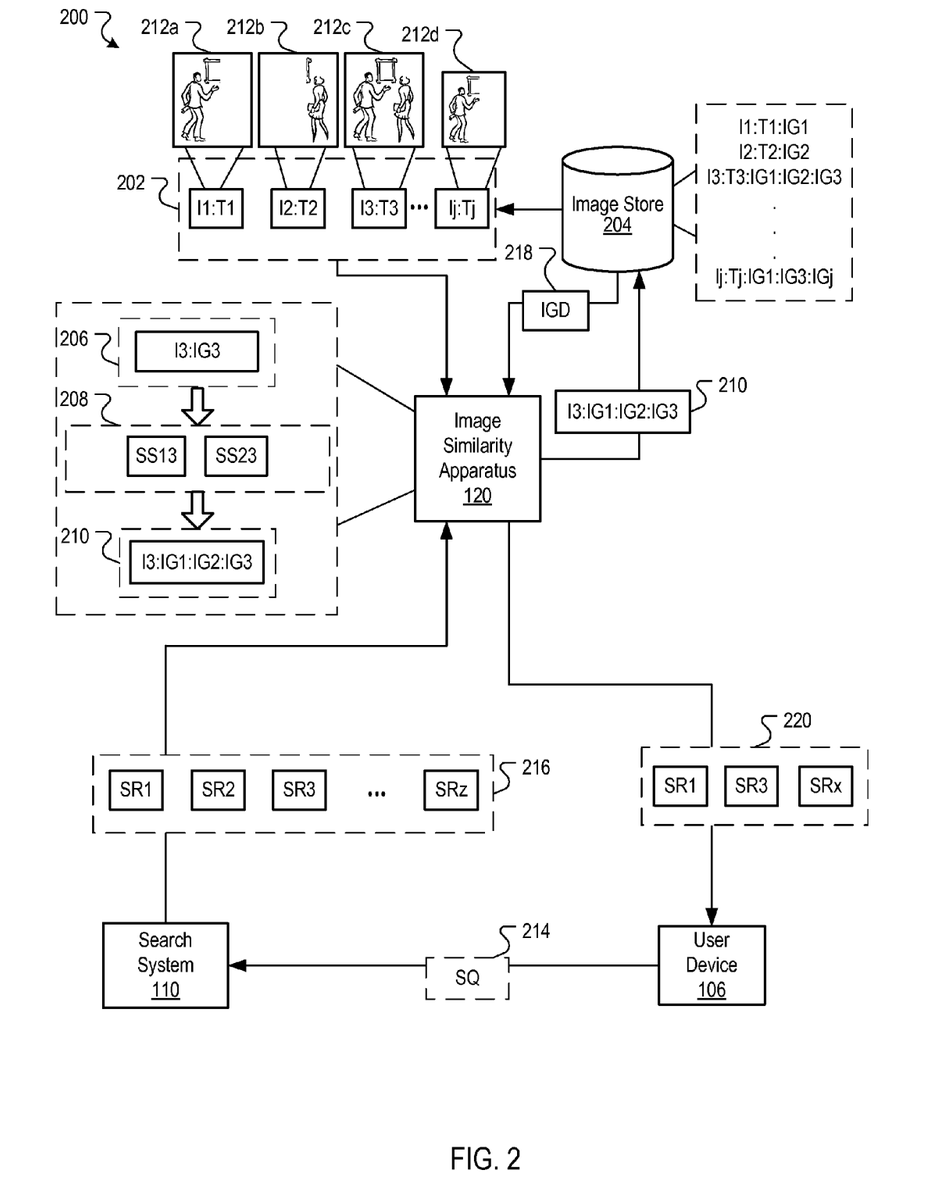
FIG. 2 is a block diagram of an example data flow for identifying near-duplicate images and filtering search results that reference near-duplicate images.

FIG. 2 is a block diagram of an example data flow 200 for identifying near-duplicate images and filtering search results that reference near-duplicate images. The data flow 200 begins with the image similarity apparatus 120 receiving image data 202 from an image data store 204. The image data store 204 is a data store that stores the image data 202. For example, the image data store 204 could be a search index in which images are indexed according to a network location (e.g., Uniform Resource Identifier) from which the image is accessible. The images can also be indexed according to an image identifier (e.g., I1-Ij) that uniquely or semi-uniquely identifies each indexed image. Each of the images can be indexed according to a time at which the image was indexed to the image data store 204. The time at which each image was indexed can be specified by a timestamp (e.g., T1-Tj) that is associated with the image.

The image data 202 includes data for multiple images that have been indexed in the image data store 204. In some implementations, the image data 202 includes an image identifier (e.g., I1-Ij), and a corresponding timestamp (e.g., T1-Tj) for each of the images that are referenced by the image identifier. The image data 202 can also include feature value data that specify feature values for the images, as described in more detail below. Alternatively, the image similarity apparatus 120 can access the image data store 204 to retrieve the feature value data for one or more of the images, or data representing the image itself can be included in the image data 202.

As illustrated in FIG. 2, example images 212a-212d are respectively referenced by the image identifiers I1-Ij. As depicted in FIG. 2, images 212a and 212b are cropped versions of the image 212c, such that the entire image 212c is not depicted by either of the images 212a or 212b. However, the images 212a and 212b may still be identified as near-duplicate images relative to the image 212c. For example, as described below, if the image similarity score for each of the images 212a and 212b (relative to the image 212c) exceed the similarity threshold (e.g., based on the portions of the image 212c that are respectively depicted by images 212a and 212c being substantially similar to portions of the image 212c), then the images 212a and 212b may be selected as near-duplicates of image 212c.

In this example, the image 212b may not be selected as a near-duplicate of the image 212a, since the images 212a and 212b generally include disjoint portions of the image 212c. Thus, the image similarity score for these images may not exceed the similarity threshold. The image 212d is a scaled version of the image 212a, such that the image 212d may be identified as a near-duplicate of image 212a and 212c, but not a near-duplicate of image 212b.

In some implementations, the image similarity apparatus 120 can assign each image a different image group identifier that identifies an initial image group to which the image belongs. The image group identifier can be, for example, a semi-random number (or another character string) that is used to identify different image groups. For example, by assigning the image group identifier IG1 to the image that is referenced by I1, the image I1 is identified as belonging to the image group IG1. As described in more detail below, the image group identifier that has been assigned to a particular image can also be assigned to other images for which the particular image has been identified as a near-duplicate image.

For purposes of example, assume that the image that is referenced by I3 is selected as the reference image for identifying near-duplicate images, and is assigned an image group identifier IG3 to create an image group 206 that includes the image that is referenced by I3. In this example, the image similarity apparatus 120 may identify other images (e.g., images referenced by I1 and I2) that are near-duplicates of the reference image, such that the image group identifiers IG1 and IG2 that have been assigned to the near-duplicate images can also be assigned to the reference image. The image similarity apparatus 120 can identify the other images (e.g., I1 and I2) that are near-duplicates of the reference image (e.g., I3) based on image similarity scores 208 (e.g., SS13 and SS23) for the other images. Each image similarity score is a value that is indicative of the visual similarity of a particular image relative to a reference image. For example, the image similarity score SS13 in FIG. 2 can be the image similarity score that indicates the visual similarity of the image referenced by I1 relative to the reference image (e.g., the image referenced by I3).

As described in more detail with reference to FIG. 4, an image similarity score for a particular image can be determined based on the feature values for the particular image and the feature values for the reference image. The feature values include values that represent visual characteristics (e.g., colors, texture, edge location, and/or other visual characteristics) of the image. In some implementations, the image similarity apparatus 120 can receive image similarity scores 208 for the images from another data processing apparatus that has pre-computed the image similarity scores 208, or from a data store that stores the image similarity scores 208. In some implementations, the image similarity apparatus 120 can compute the image similarity scores 208 using the feature values, as described with reference to FIG. 4.

The image similarity apparatus 120 compares the image similarity scores 208 to a similarity threshold that specifies a minimum similarity score that an image must have to be considered a near-duplicate of the reference image. For example, if image similarity scores have values that range from 0.0 (indicating no similarity between the images) and 1.0 (indicating that the images are identical), the value that is selected for the similarity threshold can be a value that is within the range of 0.0-1.0 (e.g., 0.8).

The images having image similarity scores (relative to the reference image) that exceed the similarity threshold are identified as near-duplicate images of the reference image (e.g., I3). In turn, the image similarity apparatus 120 assigns the group identifiers (e.g., IG1 and IG2) for each of the near-duplicate images (e.g., I1 and I2) to the reference image (e.g., I3) to create image group data 210 for the reference image. The image group data for a reference image are data that specify at least one image group to which the reference image belongs. For example, the image group data 210 specifies that the image referenced by I3 belongs to the image groups that are referenced by the image group identifiers IG1, IG2, and IG3. As described below, these image group identifiers can be used to identify image search results that reference near-duplicate images.

The image similarity apparatus 120 stores the image group data 210 in the image data store 204 (or another data store that is accessible by the image similarity apparatus 120 and/or the search system 110). The image group identifiers IG1, IG2, and IG3 that are included in the image group data 210 can be associated with (e.g., indexed according to and/or stored with a reference to) the image identifier I3 that references the image 212c.

The image similarity apparatus 120 can continue to iteratively select another reference image (e.g., Ij), assign an image group identifier to the image (e.g., IGj), and identify other images (e.g., e.g., images referenced by I1, I2, and I3) that are near-duplicates of the reference image. In turn, the image similarity apparatus 120 can include the image group identifiers (e.g., IG1, IG2, and IG3) for the near-duplicate images in a set of image group identifiers that are associated with the reference image. If no images are identified as near-duplicate images for a particular image (e.g., the image referenced by I2), the set of image group identifiers for the particular image may only include the image group identifier (e.g., IG2) that was assigned to the particular image.

In some implementations, the image similarity apparatus 120 uses the timestamps to identify an image that was first indexed to the image data store 204, and sequentially selects reference images according to the timestamps. For example, assume that timestamp T1 references a time prior to the time referenced by T2, which in turn, references a time prior to T3. In this example the image similarity apparatus 120 may first select the image referenced by I1 as the reference image, and then sequentially select the images that are respectively referenced by I2 and I3 as the reference image.

In some implementations, only those images having timestamps that reference times that are prior to the time referenced by the timestamp for the reference image are analyzed as possible near-duplicates of the reference image. For example, if the image represented by I3 is selected as the reference image, the image similarity apparatus 120 can limit a search for near-duplicate images to the images that are referenced by I1 and I2 if the timestamps T1 and T2 are the only timestamps that reference times prior to the time referenced by timestamp T3. In this example, there are no images having timestamps that reference a time prior to the time referenced by the timestamp for the "oldest" image (e.g., the image having the timestamp referencing the earliest time). Therefore, the only image group identifier that will be assigned to the image referenced by I1 is IG1. Continuing with this example, only the image referenced by I1 has a timestamp that references a time prior to the time referenced by the timestamp T2, such that the image referenced by I1 is the only image that will be analyzed as a possible near-duplicate of the image referenced by I2. As described above, the image referenced by I1 is not a considered a near-duplicate of I2, such that IG1 will not be assigned to the image referenced by I2.

In response to receipt of a search query 214 from a user device 106, the search system 110 can identify images that are relevant to (e.g., have at least a threshold relevance score for) the search query, and create search results (e.g., SR1-SRj) that reference the images (e.g., thumbnail images and/or other references to the images). The search system 110 can provide image search data 216 to the image similarity apparatus 120. The image search data 216 can include the search results or other data identifying the images were identified as relevant to the search query.

The image similarity apparatus 120 obtains (e.g., accesses or receives) image group data 218 that specify a set of image group identifiers for the images that are referenced by the search result data 216. As described above, the set of image group identifiers for each of the images can specify the image groups to which the image belongs. For example, the set of image group identifiers for each particular image can include the image group identifier for each other image that was identified as a near-duplicate of the particular image.

The image similarity apparatus 120 uses the image group identifiers for each of the images to determine whether any of the images that are referenced by the search results are near-duplicates. For example, if the sets of image group identifiers for two images each include a matching (e.g., a same) image group identifier, the two images are considered to be near-duplicates. The image similarity apparatus 120 can adjust the presentation position for one of the search results that reference the near-duplicate images. For example, the image similarity apparatus 120 can prevent a search result for one of the near-duplicate images from being provided to or presented at the user device. For example, the image similarity apparatus can cause the search result for the near-duplicate image to be removed from the search result data 216, or provide data that prevent the user device from presenting the search result for the near-duplicate image. Alternatively, the image similarity apparatus 120 can provide data that cause the search result for the near-duplicate image to be presented at a lower presentation position (e.g., a second page of the search results or a lower position of the first page of search results). In turn, final search result data 220 are provided to the user device. Note that the image similarity apparatus 120 could provide the search system 110 with data that cause the search system 110 to adjust the presentation position for a search result that references a near duplicate image.

Figure 3:
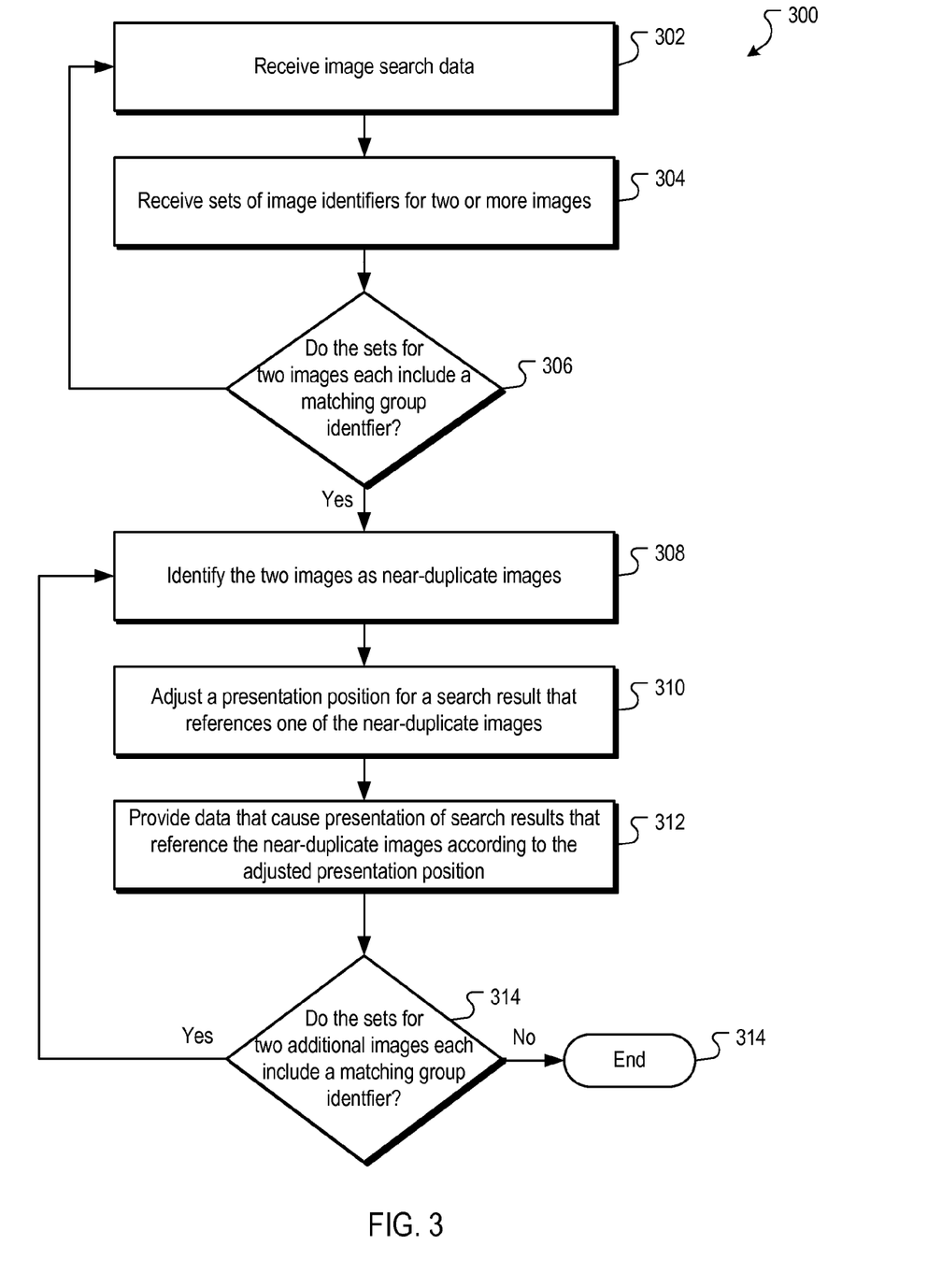
FIG. 3 is a flow chart of an example process for identifying search results that reference near-duplicate images and adjusting presentation positions of the search results that reference the near-duplicate images.

FIG. 3 is a flow chart of an example process 300 for identifying search results that reference near-duplicate images and adjusting presentation positions of the search results that reference the near-duplicate images. The near-duplicate images are two or more images that are identified as being associated with a matching (e.g., a same) image group identifier. The process 300 can be implemented, for example, by the image similarity apparatus 120 of FIG. 1. The process 300 can also be implemented as instructions stored on non-transitory computer storage medium such that execution of the instructions by data processing apparatus cause the data processing apparatus to perform the operations of the process 300.

Image search data are received by a data processing apparatus (302). In some implementations, the image search data specify images that have been identified as responsive to a search query. For example, the image search data can include data that reference many different images that have been identified as relevant to the search query "football." The references to the images can be included, for example, in search results. As described above with reference to FIG. 1, the images can be identified as relevant to the search query football based, at least in part, on having relevance scores that exceed a relevance threshold. The image search data can also specify an initial presentation position at which each of the references to the images is to be presented by a user device.

A set of image group identifiers are received for each of two or more images that are referenced in the image search data (304). In some implementations, each image group identifier in each set specifies a different image group to which the image belongs. As described above, each particular image can be associated with a different image group identifier. Additionally, each particular image can be associated with the image group identifiers for other images that have been identified as near-duplicates of the particular image. Near duplicate images of a particular image are images that have a similarity score (e.g., relative to the particular image) that exceed a similarity threshold, as described in more detail below.

A determination is made whether the sets of image group identifiers for two images each include a matching group identifier (306). In some implementations, matching group identifiers are required to be image group identifiers that are exactly the same. For example, if the set of image group identifiers for a particular image includes the image group identifier "12345," a matching group identifier may only be determined to be included in another set of image group identifiers that also include the image group identifier "12345." In some implementations, matching group identifiers need not be exactly the same. For example, a matching group identifier may only need to be one of a pre-specified set of image group identifiers. Alternatively or additionally, two image group identifiers that each includes a particular set of characters can be considered matching group identifiers. For example, the image group identifier "12345" and "12332" may be identified as being matching group identifiers since each image group identifier begins with "123".

In response to determining that the sets of image group identifiers for two images each do not include a matching image group identifier, additional image search data can be received (302). Conversely, in response to determining that the sets of image group identifiers for two images each include a matching image group identifier, the two images that are associated with (e.g., indexed according to, stored with a reference to, and/or are referenced by) the matching group identifier are identified as near-duplicate images (308).

A presentation position for a search result that references one of the near-duplicate images is adjusted (310). In some implementations, that presentation position for one of the near-duplicate images is adjusted such that the near-duplicate image will be presented at a less prominent presentation position relative to the initial presentation position at which the one near-duplicate image would have been presented prior to the adjustment. For example, assume that search results for two near duplicate images have initial presentation positions that are located at the two most prominent presentation positions of a search results page (e.g., two highest presentation positions in a vertical list of search results). In this example, the presentation position of the search result for one of the near-duplicate images can be adjusted such that the search result is presented at a lower presentation position of the same search results page, or on another page of the search results (e.g., a second or third page of the search results).

In some implementations, the adjusted presentation position of the search result can be directly specified. For example, if the initial presentation position of the search result for one of the near-duplicate images is at the second highest presentation position, the presentation position can be reset to 3 or higher, thereby lowering the presentation position of the search result. Alternatively or additionally, the presentation position can be adjusted by adjusting a relevance score (or another score) with which the presentation position is determined. In some implementations, a weight (e.g., a value between 0 and 1.0) can be used to adjust the relevance score. For example, the product of the weight and the relevance score can be used to adjust the relevance score. A logarithmic function or another function of the relevance score and the weight can also be used to adjust the relevance score.

In some implementations, the presentation position can also be adjusted, for example, by preventing one of the near-duplicate images from being presented at a user device. For example, data that identify the search result that references the near-duplicate image as ineligible for presentation can be inserted into the image search data. The user device that receives the image search data will determine based on this data that the search result that references the near-duplicate image is ineligible for presentation, and not present the search result. In some implementations, the image search data can be filtered or otherwise adjusted to remove the search result that references the near duplicate image.

In some implementations, the presentation position of the search result that references one of the near duplicate images will be adjusted, while the presentation position of the search result that references the other near duplicate image remains the same. The near duplicate image for which the presentation position of the search result will be adjusted can be selected based on one or more different characteristics of the image and/or the search result. For example, the search result having the lower initial presentation position can be the search result for which the presentation position is adjusted. In some implementations, the search result for the image having a timestamp that specifies the most recent (or least recent) time can be the search result for which the presentation position is adjusted. Other characteristics of the images (e.g., file size, user selection rates, or image quality or other characteristics) can be used to select the search result for which the presentation position is adjusted.

Data that cause presentation of search results that reference the near-duplicate images according to the adjusted presentation position are provided (312). In some implementations, the data are provided to a user device from which the search query was submitted. In some implementations, the data are provided to another data processing apparatus that further processes the data prior to providing the data to the user device.

A determination is made whether the sets of image group identifiers for two additional images each include a matching group identifier (314). In response to determining that a matching group identifier is included in the sets of group identifiers for two additional images, the two images are identified as near-duplicate images (308). Otherwise, the process 300 ends (314). In some implementations, steps 310, 312, and 314 are optional steps of the process 300, and as such, may not be performed.

Figure 4:
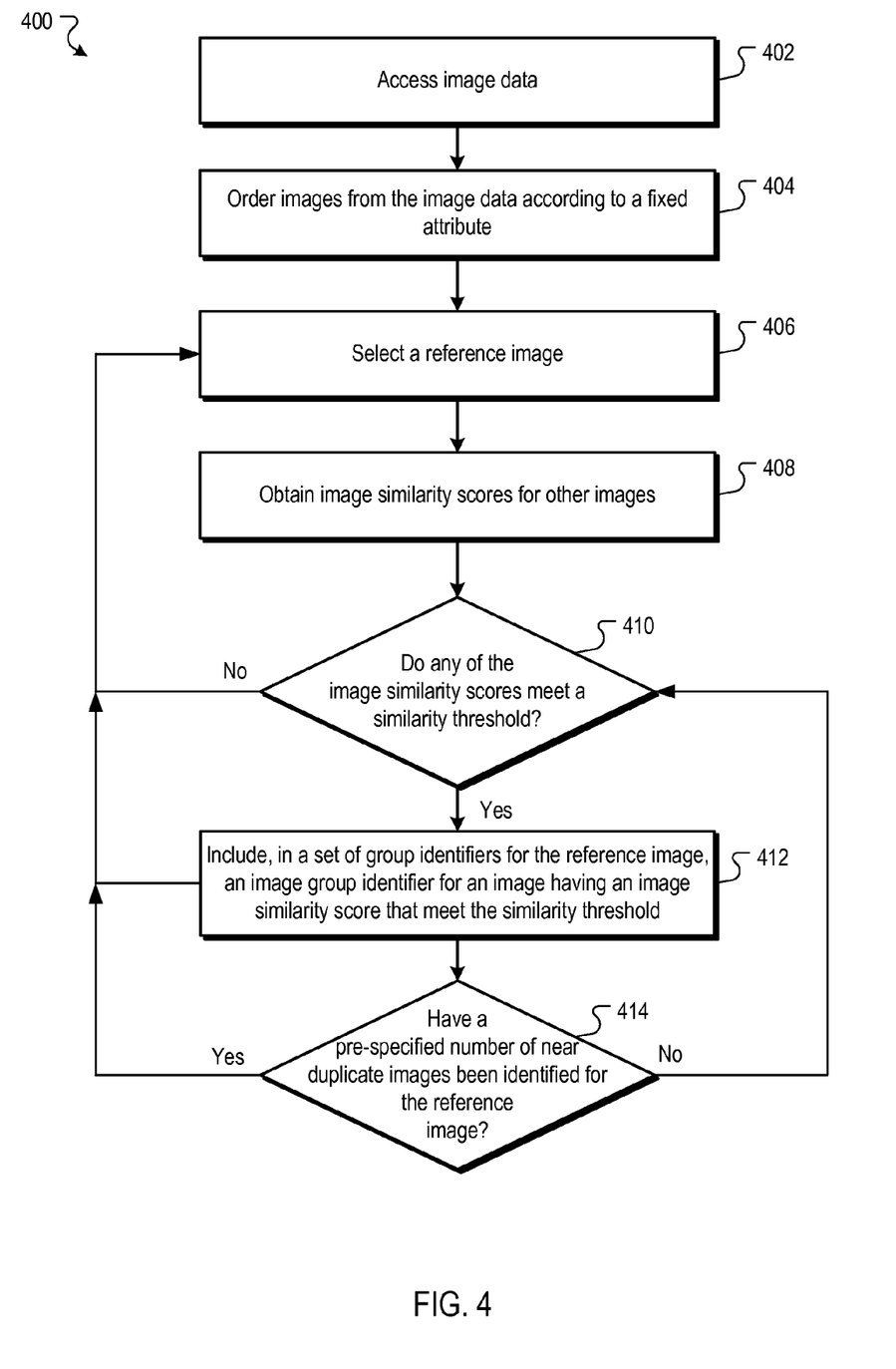
FIG. 4 is a flow chart of an example process for selecting image group identifiers for images.

FIG. 4 is a flow chart of an example process 400 for selecting image group identifiers for images. The image group identifiers that are selected for a particular image can be, for example, the image group identifiers that are associated with images that are near-duplicates of the particular image. The process 400 can be implemented, for example, by the image similarity apparatus 120 of FIG. 1. The process 400 can also be implemented as instructions stored on non-transitory computer storage medium such that execution of the instructions by data processing apparatus cause the data processing apparatus to perform the operations of the process 400.

Image data are accessed by a data processing apparatus (402). In some implementations, the image data specify a plurality of images that are included in a collection of images. For example, the image data can include image identifiers that distinctly identify each image in the corpus. The image data can also include a timestamp for each of the images. The timestamp for each of the images can specify, for example, a time at which the image was indexed by a search system or otherwise identified. The image data can also specify network locations from which feature values for the images can be obtained. Alternatively or additionally, the image data can specify the feature values for each of the images.

The feature values for each image include values that represent visual characteristics of a portion of the image. The portion of the image can include the entirety of the image or a proper subset of the image. In some implementations, the feature values can be values that are indicative of image color, texture, edges and other visual characteristics. Feature values can be computed, for example, for images during the crawling that is performed by the search system 110. The feature values can be computed at two or more image scales so that visual similarities between images at different visual scales can be more accurately determined. Example processes for extracting values of image features include processes for generating color histograms, texture detection processes (e.g., based on spatial variation in pixel intensities), scale-invariant feature transform, edge detection, corner detection and geometric blur.

The images that are included in the image corpus are ordered (404). Each of the images is assigned an ordinal position (i.e., ordered) based on a fixed attribute value that is associated with the image. A fixed attribute value for an image is a value that can be assigned to an image. In some implementations, the fixed attribute values for images are indicative of a relative order of the images, and the order of images to which fixed attribute values have been assigned may remain constant over time.

A fixed attribute value can be assigned to each image when the image is identified or indexed by a web crawler, and generally does not change values once assigned to an image. The fixed attribute value that is assigned to each sequentially identified image can be consistently increasing (or decreasing), such that later discovered (e.g., crawled or indexed) images will have a higher (or lower) fixed attribute value than previously discovered images.

For example, three images A, B, and C may be sequentially discovered and image A may be assigned the fixed attribute value of 0, while image B is assigned a fixed attribute value of 1, and image C is assigned a fixed attribute value of 2. Using these fixed attributes the images A, B, and C can be ordered according to the order in which they were respectively discovered. In some implementations, the timestamp for each of the images is selected to be the fixed attribute for the image, such that images having less recent timestamps will be assigned to higher ordinal positions than images having more recent timestamps. For example, an image with a timestamp referencing 11:11 Jan. 1, 2011 will have a higher ordinal position than an image with a timestamp referencing 23:00 Jan. 2, 2011. Using consistently increasing (or decreasing) fixed attributes facilitates identification of images that have not yet been identified as reference images, as described in more detail below.

A reference image is selected from the collection of images (406). In some implementations, the first reference image that is selected is the image that, based on the ordering, has been assigned to the highest (e.g., first) ordinal position. For example, the first reference image that is selected can be the image having an earliest timestamp (e.g., a timestamp that references an earliest time among the times referenced by the timestamps for the images). However, another image can be the first image that is selected as the reference image.

The reference image is an image to which other images will be compared to determine whether the other images are near-duplicates of the reference image. For example, if image C from the example above is selected as the reference image, the feature values for each of the images A and B can be compared to the feature values of image C to determine whether images A or B are near-duplicates of image C.

In some implementations, each image in the corpus is selected to be the reference image, such that near-duplicate images can be identified for each of the images. The order in which the images are selected to be the reference image can be based on the ordinal positions, such that the image that has been assigned the highest ordinal position can be the first reference image that is selected. Each sequential reference image that is selected following the first reference image can be the image that was assigned the next highest ordinal position relative to the ordinal position of the previous reference image. For example, if image A is first selected to be the reference image, image B can be the second reference image, and image C can be the third reference image.

An image similarity score relative to the reference image is obtained for other images in the corpus (408). Each image similarity score is a value indicative of the visual similarity between the other image and the reference image. In some implementations, the image similarity score for the other images are received from a data store that stores the image similarity scores or another data processing apparatus that is configured to compute image similarity scores.

In some implementations, the image similarity score for a particular image (relative to the reference image) can be based, for example, on a composite visual distance between the particular image and the reference image. The composite visual distance can be based on a linear or non-linear combination of visual distances between the feature values of the particular image relative to the feature values of the reference image.

For example, a Manhattan distance, Euclidean distance or any other feature distance for each feature value can be determined relative to the feature values of the reference image to generate a set of feature value to reference image distances. In turn, a visual distance vector for the particular image is generated based on the feature value to reference image distances. Each feature distance in the visual distance vector for the particular image corresponds to a distance between a feature value for the particular image and a corresponding feature value (e.g., a feature value that is of the same type and is most proximate to the feature value for the particular image) for the reference image.

An image similarity model (e.g., a model trained to provide image similarity measures based on visual distance vectors) can be applied to the visual distance vector to determine a measure of similarity of the image relative to the query image. For example, a result of the dot product of the visual distance vector for a particular image and the image similarity model can be defined as the image similarity score for the particular image relative to the reference image.

A determination is made whether any of the image similarity scores for the other images meets a similarity threshold (410). In some implementations, the similarity threshold is a minimum image similarity score that an image must have to be considered a near-duplicate of the reference image. The determination can be made, for example, by comparing the image similarity score for each of the other images to the similarity threshold. In some implementations, the determination begins by comparing the image similarity score for the oldest image to the similarity threshold, and then subsequent (or parallel) determinations can be made for each of the next "newer" images (e.g., based on the timestamps) by comparing each similarity score to the similarity threshold. As described below, the determination can continue to be iteratively performed until a pre-specified number of near-duplicate images have been selected for the reference image.

In response to determining that none of the image similarity scores meets (e.g., equals or exceeds) the similarity threshold, another reference image can be selected (406). In response to determining that one or more of the image similarity scores meets the similarity threshold, an image group identifier for an image having an image similarity score that meets the similarity threshold are included in a set of image group identifiers for the reference image (412). For example, if image A from the example above is determined to have an image similarity score (relative to image C) that exceeds the similarity threshold, the image group identifier that has been assigned to image A can be included in a set of image group identifiers for image C. Similarly, if the image similarity score for image B (e.g., relative to image C) is also determined to meet the similarity threshold, the image group identifier for image B can also be included in the set of image group identifiers for image C.

In some implementations, the determination of whether any image similarity scores meet the similarity threshold is performed only for those images having higher ordinal positions than the reference image. For example, if image C is the reference image and in the third ordinal position, while images A and B are in the first and second ordinal positions (which are higher ordinal positions than the third ordinal position), it may be determined whether either of the similarity scores for images A or B (relative to image C) meet the similarity threshold. However, when image B is the reference image, the determination may be limited to determining whether the similarity score for image A (relative to image B) meets the threshold, while the determination whether the image similarity score for image X (relative to image B) may not be made. In these implementations, when image A is the reference image, there are no images at higher ordinal positions, such that no determination needs to be made. Therefore, the set of image group identifiers for image A may only include the image group identifier that has been assigned to image A, as described above.

Determining only whether images having higher ordinal positions than the reference image are near-duplicates of the reference image prevents iterative analysis of the same reference images since near-duplicates at lower ordinal positions will include the image group identifiers of the images having higher ordinal positions. For example, assume that Table 1 represents the sets of image group identifiers after each of the images A, B, and C have been selected as reference images and the identification of near-duplicate images has been performed.

TABLE 1

| Image | Set of Image Group identifiers |
|---|---|
| A | GIA |
| B | GIA, GIB |
| C | GIB, GIC |

In this example, the image group identifiers that were respectively assigned to images A, B, and C are GIA, GIB, and GIC. According to Table 1 image A was determined to be a near-duplicate of image B when image B was selected as the reference image, and image B was identified as being a near-duplicate (e.g., based on the image similarity score exceeding the similarity threshold) of image C, when image C was selected as the reference image.

Further assume an additional image D is discovered, and image D is selected as the reference image. In this example, image similarity scores for images A, B, and C (relative to image D) will be compared to the similarity threshold to determine whether images A, B, and C are near duplicates of image D. If images A and B are determined to be near duplicates of image D, but image C is determined to not be a near duplicate of image D, the sets of image group identifiers can be represented by Table 2.

TABLE 2

| Image | Set of Image Group Identifiers |
|---|---|
| A | GIA |
| B | GIA, GIB |
| C | GIB, GIC |
| D | GIA, GIB, GID |

As illustrated by Table 2, the set of image group identifiers for image D includes the image group identifiers for images A and B such that each of images A, B, and D, which were all identified as near-duplicate images. Therefore, if images A and D are both identified as responsive to a query, a comparison of the sets of image group identifiers would reveal that images A and D are near-duplicates because they each include GIA. Thus, image A need not be selected as a reference image following the discovery of image D in order to identify images A and D as near-duplicate images.

Additional image group identifiers can also be included in the set of image group identifiers can also be included in the set of image group identifiers for the reference image. In some implementations, two or more different image group identifiers from a set of image group identifiers for a near-duplicate image (relative to the reference image) can be included in the set of image group identifiers for the reference image. For example, with reference to Table 2, once the image B has been identified as a near-duplicate of image C, the image group identifier GIA, which is included in the set of image group identifiers for image B, can be included in the set of image group identifiers for group C, such that the set of image group identifiers for image C will include GIA, GIB, and GIC.

In some implementations, only the image group identifier for the image having the earliest timestamp (or one of a predetermined number of earliest timestamps) is selected as an additional image group identifier for the reference image. For example, assume that another image E is discovered, and determined to only be a near-duplicate of image D. In this example, the set of image group identifiers for image E will include GIE, which was assigned to image E, as well as the image group identifier GID which is the image group identifier for image D. In this example, even though the set of image group identifiers for image D includes GIA and GIB, GIA may be the only image group identifier that is selected as an additional image group identifier for image E that will be included in the set of image group identifiers for image E.

In some implementations, the number of image group identifiers that are included in each set of image group identifiers can be restricted to an identifier maximum (i.e., a value indicating a maximum number of image group identifiers that can be included in a set of image group identifiers). For example, each set of image group identifiers may only include N number of image group identifiers, where N is an integer. Alternatively, the identifier maximum for each set of image group identifiers may be proportional, or otherwise based on, a number of search queries for which the image has been identified as responsive and/or a number (or portion) of users that have interacted with search results that reference the image. Basing the identifier maximum on the number of search queries (or user interactions) for each image enables the number of image group identifiers that are stored for an image that is referenced by search results more often than another image to be higher than the number of image group identifiers that are stored for the other image.

A determination is made whether a pre-specified number of near duplicate images have been identified for the reference image (414). The pre-specified number of near-duplicate images can be selected based on available computing resources and an acceptable near-duplicate recall value (e.g., portion of near-duplicates that are identified). As the pre-specified number is increased, the percentage of all near-duplicate images that are identified will increase, such that the near-duplicate recall will increase. However, the computing resources required to analyze the images and the memory required to store data identifying the near-duplicate images will also increase in proportion to the pre-specified number. Therefore, by limiting the number of near-duplicate images that are identified for a particular reference image, the computing resources that are utilized identifying the near-duplicate images for that particular reference image are also limited.

If the pre-specified number of near-duplicate images has not been identified for the reference image, a determination is made whether there are additional images having image similarity scores that meet the similarity threshold (410). If the pre-specified number of near-duplicate images has been identified for the reference image, another reference image can be selected, such that near-duplicate images may not continue to be identified for the current reference image.

As described above, the determination of whether images are near-duplicates of the reference images can begin with a determination of whether the oldest image (or the image that otherwise occupies the first ordinal position) is a near-duplicate of the reference image. Each next image (e.g., having a next more recent timestamp or otherwise occupying a next ordinal position) can then analyzed to determine whether the next image is a near duplicate image. Analyzing the images relative to the reference in this manner results in the order in which images are compared to the reference remaining constant for each reference image. Thus, the image group identifier for the oldest image can be included in each set of image group identifiers for each reference image that is identified as a near-duplicate of the oldest image. In turn, each of the images having a set of image group identifiers that includes the image group identifier for the oldest image can be determined to be near-duplicates of each other irrespective of whether the images were directly compared to each other.

For example, assume that image A (e.g., the oldest image) is identified as a near-duplicate of both image Y and image Z (e.g., the $99^{th}$ and $100^{th}$ oldest images respectively). Also assume that the pre-specified number of near-duplicates images for each of image Y and image Z were identified prior to analysis of whether images Y and Z were near duplicate images. In this example, the image group identifier for image A will be included in the sets of image group identifiers for each of image Y and image Z. Therefore, image Y and image Z are identifiable as near-duplicate images, as described with reference to FIG. 3.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   receiving image search data specifying images that have been identified as responsive to a query and ranking information specifying candidate presentation positions of search results that reference the images;
   for each of two or more of the images responsive to the query, receiving a set of image group identifiers that specify different groups of images that include the image;
   determining that the sets of image group identifiers for two of the images, from the two or more of the images responsive to the query, each include a matching image group identifier;
   determining that the two images responsive to the query are near-duplicate images based on the determination that the sets of group identifiers for the two images each include a matching image group identifier;
   adjusting, based on the determination that the two images are near duplicate images, a presentation position of a first search result for one of the near-duplicate images from the candidate presentation position to a lower presentation position relative to a location of the candidate presentation position of a second search result for a second of the near-duplicate images; and
   providing data that cause presentation of the search results for the near-duplicate images according to the adjusted presentation position.

2. The method of claim 1, further comprising:
   receiving image data specifying a plurality of images that are included in a collection of images, the image data specifying feature values for each of the images, the feature values for each image including values that represent visual characteristics of the image;
   selecting a first reference image from the collection of images;
   for each of a plurality of other images in the collection of images, receiving a first image similarity score for the other image, the first image similarity score being indicative of visual similarity between the other image and the first reference image;
   identifying the other images that have a first image similarity score that exceeds a similarity threshold; and
   including, in a set of image group identifiers for the reference image, an image group identifier for at least one of the other images that have the first image similarity score that exceeds the similarity threshold.

3. The method of claim 2, further comprising ordering the plurality of images that are included in the collection of images according to a fixed attribute for the plurality of images.

4. The method of claim 3, wherein:
   receiving image data comprises receiving image data that include timestamps indicating times at which the images were added to the collection of images; and
   ordering the plurality of images according to a fixed attribute comprises assigning the images to ordinal positions according to the times indicated by the timestamps for the images, the image having a timestamp indicating an earliest time among the times being at a highest ordinal position.

5. The method of claim 4, further comprising:
   selecting a second reference image from the collection of images, the second reference image being in a next ordinal position relative to the ordinal position of the first reference image;
   for each of a plurality of the other images that are at higher ordinal positions relative to the next ordinal position of the second reference image, obtaining a second image similarity score for each of the other images, the second image similarity score being indicative of a visual similarity between the other image and the second reference image; and
   including, in a set of image group identifiers for the second reference image, image identifiers for each of the other images for which the second similarity score exceeds the similarity threshold.

6. The method of claim 5, further comprising including, in the set of image group identifiers for the second reference image, an additional image group identifier that is selected from a set of group identifiers for one of the other images for which the second similarity score exceeds the similarity threshold.

7. The method of claim 4, wherein adjusting the presentation position for a search result that references one of the near-duplicate images comprises adjusting the presentation position of the search result for the near-duplicate image having a timestamp that specifies a most recent time.

8. The method of claim 1, wherein adjusting a presentation position for a search result that references one of the near-duplicate images comprises causing the search result that references one of the near-duplicate images to be presented at a less prominent presentation position relative to the presentation position at which the search result for the one near-duplicate image would have been presented prior to the adjustment.

9. The method of claim 1, wherein adjusting a presentation position for a search result that references one of the near-duplicate images comprises preventing the search result for one of the near-duplicate images from being provided to or presented at a user device.

10. The method of claim 1, wherein determining that the sets of image group identifiers for two images each include a matching image group identifier comprises determining that the sets of image group identifiers for the two images include a same matching image group identifier.

11. A non-transitory computer storage medium encoded with a computer program, the program comprising instructions that when executed by one or more data processing apparatus cause the one or more data processing apparatus to perform operations comprising:
   receiving image search data specifying images that have been identified as responsive to a query and ranking information specifying candidate presentation positions of search results that reference the images;
   for each of two or more of the images responsive to the query, receiving a set of image group identifiers that specify different groups of images that include the image;
   determining that the sets of image group identifiers for two of the images, from the two or more of the images responsive to the query, each include a matching image group identifier;
   determining that the two images responsive to the query are near-duplicate images based on the determination that the sets of group identifiers for the two images each include a matching image group identifier;
   adjusting, based on the determination that the two images are near duplicate images, a presentation position of a first search result for one of the near-duplicate images from the candidate presentation position to a lower presentation position relative to a location of the candidate presentation position of a second search result for a second of the near-duplicate images; and
   providing data that cause presentation of the search results for the near-duplicate images according to the adjusted presentation position.

12. The computer storage medium of claim 11, wherein instructions further cause the data processing apparatus to perform operations comprising:
   receiving image data specifying a plurality of images that are included in a collection of images, the image data specifying feature values for each of the images, the feature values for each image including values that represent visual characteristics of the image;
   selecting a first reference image from the collection of images;
   for each of a plurality of other images in the collection of images, receiving a first image similarity score for the other image, the first image similarity score being indicative of visual similarity between the other image and the first reference image;
   identifying the other images that have a first image similarity score that exceeds a similarity threshold; and
   including, in a set of image group identifiers for the reference image, an image group identifier for at least one of the other images that have the first image similarity score that exceeds the similarity threshold.

13. The computer storage medium of claim 12, wherein the instructions further cause the one or more data processing apparatus to perform operations comprising ordering the plurality of images that are included in the collection of images according to a fixed attribute for the plurality of images.

14. The computer storage medium of claim 13, wherein:
   receiving image data comprises receiving image data that include timestamps indicating times at which the images were added to the collection of images; and
   ordering the plurality of images according to a fixed attribute comprises assigning the images to ordinal positions according to the times indicated by the timestamps for the images, the image having a timestamp indicating an earliest time among the times being at a highest ordinal position.

15. The computer storage medium of claim 14, wherein the instructions further cause the one or more data processing apparatus to perform operations comprising:
   selecting a second reference image from the collection of images, the second reference image being in a next ordinal position relative to the ordinal position of the first reference image;
   for each of a plurality of the other images that are at higher ordinal positions relative to the next ordinal position of the second reference image, obtaining a second image similarity score for each of the other images, the second image similarity score being indicative of a visual similarity between the other image and the second reference image; and
   including, in a set of image group identifiers for the second reference image, image identifiers for each of the other images for which the second similarity score exceeds the similarity threshold.

16. The computer storage medium of claim 15, wherein the instructions further cause the one or more data processing apparatus to perform operations comprising including, in the set of image group identifiers for the second reference image, an additional image group identifier that is selected from a set of group identifiers for one of the other images for which the second similarity score exceeds the similarity threshold.

17. The computer storage medium of claim 14, wherein adjusting the presentation position for a search result that references one of the near-duplicate images comprises adjusting the presentation position of the search result for the near-duplicate image having a timestamp that specifies a most recent time.

18. The computer storage medium of claim 11, wherein adjusting a presentation position for a search result that references one of the near-duplicate images comprises causing the search result that references one of the near-duplicate images to be presented at a less prominent presentation position relative to the presentation position at which the search result for the one near-duplicate image would have been presented prior to the adjustment.

19. The computer storage medium of claim 11, wherein adjusting a presentation position for a search result that references one of the near-duplicate images comprises preventing the search result for one of the near-duplicate images from being provided to or presented at a user device.

20. The computer storage medium of claim 11, wherein determining that the sets of image group identifiers for two images each include a matching image group identifier comprises determining that the sets of image group identifiers for the two images include a same matching image group identifier.

21. A system comprising:
a data store storing image group identifiers for images, different image group identifiers specifying different image groups to which an image belongs; and
one or more computers operable to interact with the data store, the one or more computers being further operable to perform operations including:
receiving image search data specifying images that have been identified as responsive to a query and ranking information specifying candidate presentation positions of search results that reference the images;
for each of two or more of the images responsive to the query, receiving a set of image group identifiers that specify different groups of images that include the image;
determining that the sets of image group identifiers for two of the images, from the two or more of the images responsive to the query, each include a matching image group identifier;
determining that the two images responsive to the query are near-duplicate images based on the determination that the sets of group identifiers for the two images each include a matching image group identifier;
adjusting, based on the determination that the two images are near duplicate images, a presentation position of a first search result for one of the near-duplicate images from the candidate presentation position to a lower presentation position relative to a location of the candidate presentation position of a second search result for a second of the near-duplicate images; and
providing data that cause presentation of the search results for the near-duplicate images according to the adjusted presentation position.

22. The system of claim 21, wherein the one or more computers are further operable to perform operations including:
receiving image data specifying a plurality of images that are included in a collection of images, the image data specifying feature values for each of the images, the feature values for each image including values that represent visual characteristics of the image;
selecting a first reference image from the collection of images;
for each of a plurality of other images in the collection of images, receiving a first image similarity score for the other image, the first image similarity score being indicative of visual similarity between the other image and the first reference image;
identifying the other images that have a first image similarity score that exceeds a similarity threshold; and
including, in a set of image group identifiers for the reference image, an image group identifier for at least one of the other images that have the first image similarity score that exceeds the similarity threshold.

23. The system of claim 22, wherein the one or more computers are further operable to perform operations including ordering the plurality of images that are included in the collection of images according to a fixed attribute for the plurality of images.

24. The system of claim 23, wherein:
receiving image data comprises receiving image data that include timestamps indicating times at which the images were added to the collection of images; and
ordering the plurality of images according to a fixed attribute comprises assigning the images to ordinal positions according to the times indicated by the timestamps for the images, the image having a timestamp indicating an earliest time among the times being at a highest ordinal position.

25. The system of claim 24, wherein the one or more computers are further operable to perform operations including:
selecting a second reference image from the collection of images, the second reference image being in a next ordinal position relative to the ordinal position of the first reference image;
for each of a plurality of the other images that are at higher ordinal positions relative to the next ordinal position of the second reference image, obtaining a second image similarity score for each of the other images, the second image similarity score being indicative of a visual similarity between the other image and the second reference image; and
including, in a set of image group identifiers for the second reference image, image identifiers for each of the other images for which the second similarity score exceeds the similarity threshold.

26. The system of claim 25, wherein the one or more computers are further operable to perform operations including inserting, in the set of image group identifiers for the second reference image, an additional image group identifier that is selected from a set of group identifiers for one of the other images for which the second similarity score exceeds the similarity threshold.

27. The system of claim 24, wherein adjusting the presentation position for a search result that references one of the near-duplicate images comprises adjusting the presentation position of the search result for the near-duplicate image having a timestamp that specifies a most recent time.

28. The system of claim 21, wherein adjusting a presentation position for a search result that references one of the near-duplicate images comprises causing the search result that references one of the near-duplicate images to be presented at a less prominent presentation position relative to the presentation position at which the search result for the one near-duplicate image would have been presented prior to the adjustment.

29. The system of claim 21, wherein adjusting a presentation position for a search result that references one of the near-duplicate images comprises preventing the search result for one of the near-duplicate images from being provided to or presented at a user device.

30. The system of claim 21, wherein determining that the sets of image group identifiers for two images each include a matching image group identifier comprises determining that the sets of image group identifiers for the two images include a same matching image group identifier.

* * * * *